United States Patent [19]

Hayford et al.

[11] Patent Number: 4,854,688
[45] Date of Patent: Aug. 8, 1989

[54] OPTICAL ARRANGEMENT

[75] Inventors: Michael J. Hayford, Monrovia; Donald G. Koch, Burbank, both of Calif.

[73] Assignee: Honeywell Inc., Minneapolis, Minn.

[21] Appl. No.: 181,612

[22] Filed: Apr. 14, 1988

[51] Int. Cl.$^4$ .................. G02B 27/14; G02B 3/00; G02B 17/00

[52] U.S. Cl. .................. 350/571; 350/174; 350/416; 350/445

[58] Field of Search .............. 350/571, 174, 416, 445

[56] References Cited

U.S. PATENT DOCUMENTS 3,947,086  3/1976  Hunzinger ............... 350/571
4,655,540  4/1987  Wood et al. ............. 350/174
4,714,320  12/1987 Banbury ................. 350/174

FOREIGN PATENT DOCUMENTS 664754  1/1952  United Kingdom ........ 350/416

*Primary Examiner*—Rodney B. Bovernick
*Assistant Examiner*—Ronald M. Kachmarik
*Attorney, Agent, or Firm*—Kinney & Lange

[57] ABSTRACT

A compact optical arrangement for transfer of large field of view images to the pupil of a viewer, said optical arrangement including a cooperative collimator/combiner and ball lens, wherein the ball lens is positioned at the location of the image of said pupil formed by said collimator/combiner.

10 Claims, 1 Drawing Sheet

OPTICAL ARRANGEMENT

BACKGROUND OF THE INVENTION

1. Field of the Invention.

The present invention is directed toward the compact, quality optical transmission of selected images from one location to another, and more particularly toward an optical arrangement for quality transmission of said images along a non-linear path, and their ultimate, collimated presentation with a broad field of view and as though they were located at infinity.

A patent application for a related invention, "Helmet Mounted Display with Improved Brightness", Ser. No. 07/078,947, was filed by the same assignee as herein, Honeywell, Inc., on July 29, 1987, based upon a concept developed by Donald J. Rotier. This application is hereby expressly incorporated herein by reference.

2. Background, Objects and Description of the Prior Art

It is frequently desirable to produce an optical arrangement of elements, which transmits selected images from one location, where they are produced, to another location, where they are conveniently viewed.

In many instances, it is further desirable for the optical arrangement to be compact in order to conserve space, and to maintain the highest possible level of image quality.

In addition to optimizing image quality, it is frequently desired to present the image transmitted with a large field of view.

Further, in order to minimize viewer fatigue, it is desirable for the image ultimately presented, to be produced in collimated fashion, i.e., as though it were located at infinity. For example, in the case of a pilot scanning the horizon and the scene around his plane or helicopter, it creates fatigue for the pilot to have to refocus every time he glances at his instruments for information as to flight conditions. If this information or part of it is presented properly, with a broad field of view and as though at infinity, the pilot will not need not refocus and search repeatedly for the information desired.

In one particular arrangement of the prior art, it is desired for the pilot to view an image which is transmitted from a cathode ray tube ("CRT") mounted on the side of his helmet to his eye. The optical arrangement employed is complex in construction, as it requires the careful construction and precise alignment and positioning of a large number of optical elements in a compact, tubular containment which takes several bends around the face of the pilot as mounted on the helmet. To design and manufacture such an arrangement involves the critical step of initially taking a correct approach in the selection of particular components and elements in the arrangement and then applying well-known, straight forward optical design techniques, including computer simulations, to correct the image aberrations caused by the selected elements.

It is thus a particular object of the invention herein to correctly select key optical elements in the arrangement and to effectively design the remainder of the arrangement to contain all of the optical elements of the arrangement within narrow, confined spaces along a folded path.

Because of the limitations inherent in the selection of particular elements for image translation, present approaches to this problem are generally only effective for producing images with a moderate field of view. Such approaches are further often hampered by undue divergence of light along the optical path through which the images are transmitted.

One arrangement of the prior art, which is hampered as indicated above, includes in the optical arrangement, several turn prisms for changing the direction of the light rays. The use of such positive elements in systems with a wide field of view has a very deleterious effect on the quality of the images presented to the viewer. In addition, depending upon the particular adjacent optical element employed for image quality improvement, the combination can be very difficult to properly align, assemble and construct.

SUMMARY OF THE INVENTION

The present invention is directed toward the compact optical transmission or relay of an image, which may for example be formed on a display (e.g. a CRT) to a viewer in a collimated, wide field of view fashion. The optical transmission or relaying is performed in an optical arrangement which includes a ball lens element positioned at or near the location of the image of the viewer's eye pupil.

According to one version of the invention, the ball lens element defines front and back surfaces which are concentric about the center of the element. According to another version of the invention, the optical arrangement of the invention includes first and second meniscus elements adjacent to and partially surrounding the surface of the ball lens, with the surfaces of the meniscus lens being concentric with the center of the ball lens element. According to this version of the invention, the ball lens element is made of a material which has a lower index of refraction than the materials employed for the meniscus lens elements.

According to one version of the invention, in which the optical arrangement transmits or relays images along a folded path, the ball lens itself is folded at its center to reflect the light rays being relayed or transmitted.

According to another version of the invention, the ball lens is combined with a collimator to enable presentation of images with a large field of view as though located at infinity. In particular, according to this version, the optical arrangement comprises a collimator element, i.e., a lens or mirror (partially or completely reflective), which projects an image presented to it at infinity. The collimator also directs this image at infinity into the viewer's eye pupil.

The optical arrangement according to the invention further comprises a ball lens element which is used in combination with the collimator. The ball lens forms the image which the collimator projects to infinity. Furthermore, the center of the ball lens further is located such that the collimator images it into the viewer's eye pupil. This means that the light rays which pass through the center of the viewer's pupil from anywhere in the field of view will be transmitted through the ball lens perpendicular to the outer surfaces of the ball lens. This feature considerably enhances the quality of the image presented to the viewer.

In addition, the optical arrangement includes further transmission and reflective elements which work in conjunction with the ball lens and collimator to relay the image on the CRT to the viewer. The light path from CRT to viewer is folded to conform to the viewer's face and is narrowly confined so as to take up minimal volume. The light path in the present invention deviates from a straight line at least once, by reflection from a flat or curved surface.

A more complete understanding of the invention will be obtained upon an examination of the following specification and claims read in connection with the attached drawing.

BRIEF DESCRIPTION OF THE DRAWING

The objects and advantages of the invention will become particularly apparent from a detailed consideration of the Drawing, the Figure of which is a side schematic illustration of a preferred version of the optical arrangement toward which the invention herein is directed.

DETAILED DESCRIPTION OF THE PREFERRED EMBODIMENT

Figure 1:
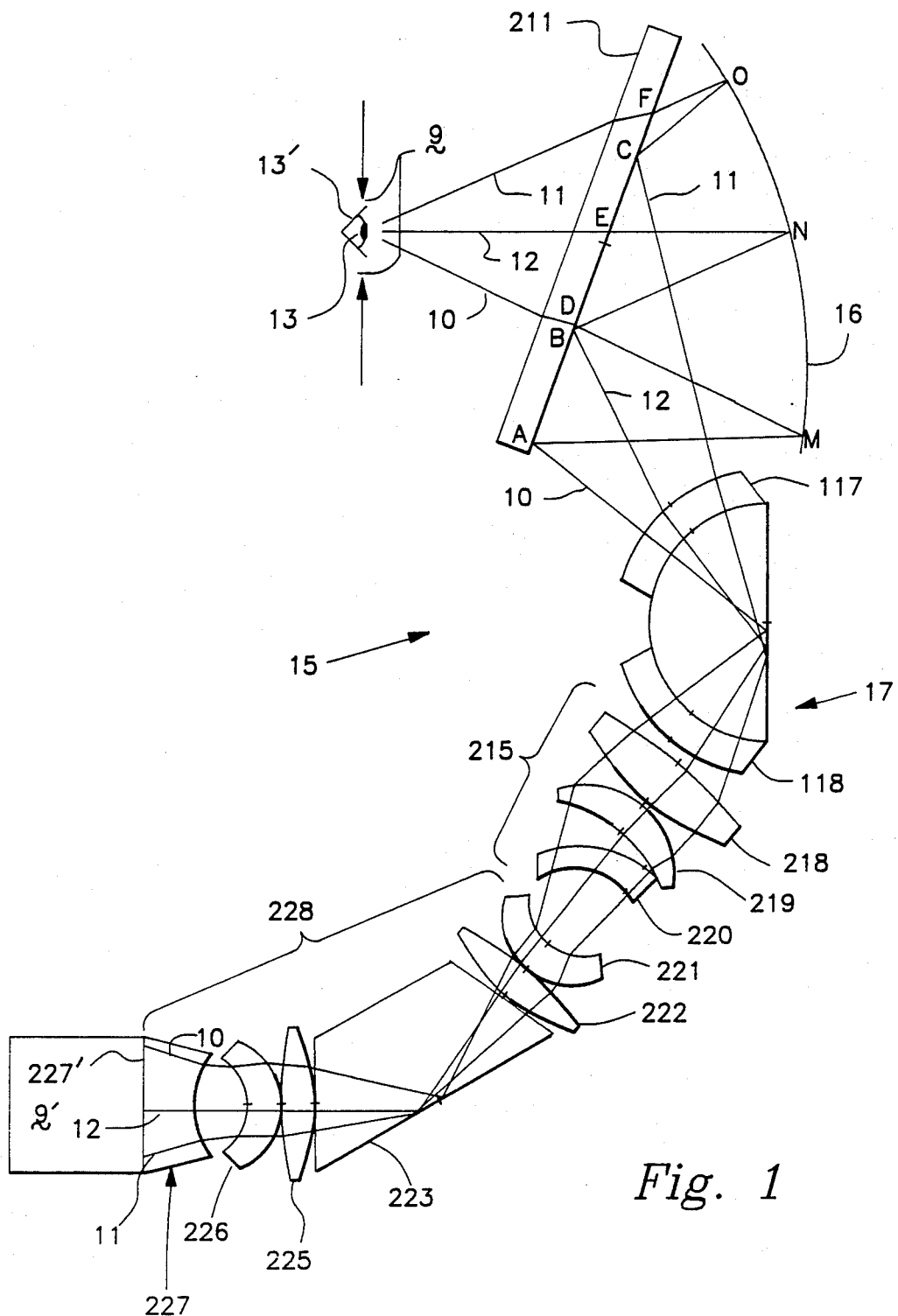

A preferred version of the invention herein can be employed for the purposes suggested in the aboveferenced and incorporated patent application, "Helmet Mounted Display with Improved Brightness".

According to the preferred version of the invention and as suggested in the Figure, the optical arrangement 15 comprises a plurality of lens elements which relay an image formed on display such as a CRT, for example, to the eye of the viewer. The image is presented in a collimated form which subtends a wide field of view. The optical path is folded and constricted such that it can be compactly mounted on the helmet of an aircraft of helicopter pilot, for example.

In particular, as shown in the Figure, a small display unit such as a cathode ray tube, i.e. CRT 9', can be mounted with the optical arrangement 15 of the invention herein. The referenced patent application suggests generally how the CRT can be mounted on the helmet of an aircraft pilot, for transmission of selected images from the CRT 9', to a region 9 at which the pupil 13 of the pilot's eye 13', is positioned.

The CRT 9' receives video signals along an electrical signal line (not shown), and transmits selected light images including upper, lower and middle image beams of rays, respectively 10, 11, and 12, as shown in the Figure. According to the invention herein, and as suggested in the Figure, the optical arrangement 15 comprises a plurality of lens elements, including collimator 16, which is cooperatively positioned with respect to ball lens 17. The combined effect of properly positioning and aligning a correctly designed ball lens 17 with respect to collimator 16 in the optical arrangement 15 of the invention results in presentation of the image on the CRT 9' in collimated fashion and with a desired broad field of view, which enables the pilot to have the information he needs while continuing to view the scene developing before his eyes during flight operations.

Optical arrangement 15 is accordingly effective for transporting selected images and making a collimated, large field of view presentation of the selected images to the pupil 13 of a viewer's eye 13'. Optical arrangement 15 accomplishes this by comprising, inter alia, collimator 16 as either a lens or reflector element (partially or completely reflective) for receiving the diverging light which carries the selected images. The collimator 16 is effective for transforming light images received into a collimated beam and transmitting said images to the pupil 13 of the viewer's eye in collimated fashion.

The optical arrangement 15 according to the invention further comprises a ball lens 17 for cooperating with the collimator 16. The ball lens 17 is positioned at the location of an image of the pupil 13 of the viewer and considerably enhances the image quality presented to the viewer, who may be a pilot.

The selected images produced on the CRT 9' are ultimately presented to the eye 13' of the pilot after being transmitted along a compact optical path which includes image beams, or rays, 10, 11 and 12. These beams are shown for illustration and permit detailed analysis of the projection of light images from an object being viewed, such as the face of a CRT 9', for example, to the eye of the beholder, such as a pilot. The light departing from an upper portion of the CRT 9' and passing through the optical arrangement of the invention will constitute upper light beam 10. Similarly, light departing from respective, selected lower and middle portions of the CRT 9' will constitute lower and middle light beams 11 and 12, which pass through the optical arrangement 15 of the invention herein.

According to one version of the invention, the optical arrangement 15 would be mounted on or inside the helmet of a helicopter pilot to transfer the image on a relatively small CRT likewise mounted within the helmet to the pupil 13 of the pilot. The light images actually provided to the pilot are collimated to effect the appearance of images viewed at infinity. This impression is sought, because the pilot's eye is generally focused at infinity during flight operations to permit a continued view the surrounding environment in which he flies. Thus, the image transmitted for his viewing is intended to appear to be at infinity as well, in order not to cause eye fatigue by the continuing need to refocus between infinity and another, closer viewing range.

According to the preferred version of the invention and as suggested in the Figure, the optical arrangement 15 comprises ·a plurality of lens elements, including collimator 16, which is cooperatively positioned with respect to ball lens 17. The optical arrangement further includes beamsplitter 211, which is thoroughly discussed in the patent application expressly incorporated herewith.

Simply stated, the image of the CRT 9' is transmitted through a number of optical elements, and finally through ball lens 17. The particular ball lens design employed according to this version of the invention is a folded ball lens comprising the form of a hemisphere, which is effective for internally reflecting the image received from the preceding optical elements toward beamsplitter 211.

Beamsplitter 211 reflects the received image toward collimator 16, which is effective for collimating the otherwise diverging light from the ball lens 17. In fact, the curvature of the collimator 16 is specifically designed to effect collimation of light from the ball lens 17. Once the light image departs in collimated fashion from collimator 16, it passes through beamsplitter 211 toward the eye 13' of the pilot.

Optical arrangement 15 additionally includes a combination of lens 215 which are used in conjunction with the ball lens to relay the intermediate image formed near lens 220 to another intermediate image formed near the beamsplitter surface. These lens 215 are also tilted and decentered with respect to the optical path and these tilts and decentrations serve to correct for the asymmetric aberrations introduced by the tilt of the collimating element 16.

All of the optics between the CRT image source 9' and the intermediate image formed near lens 220 are rotationally symmetrical. This combination of lens 228 serves to relay the CRT image in addition to performing the aberration correction functions typical of optical projection systems. The selection of the individual lens used for lens combinations 215 and 228 is accomplished by conventional design techniques which are well known to optical engineers.

With regard to other elements of the optical arrangement 15, it is significant that beamsplitter 211 according to this particular version of the invention is substantially planar. In some cases, however, it may be desirable for beamsplitter 211 to have some curvature. Collimator 16 herein is preferably spherical. However, in some instances, it may be useful to employ a curved surface which is not precisely spherical. Additionally, collimator 16 is preferably coated so as to be reflective to the narrow band of wavelengths emitted by the cathode ray tube 9', which in the preferred embodiment, may be the green spike between 540 nm and 550 nm from a P43 or P53 phosphor. All other wavelengths are predominantly transmitted by collimator 16. Additional details regarding the construction of a preferred mode for carrying out this invention are found in the above-indicated patent application which is incorporated herein.

According to a preferred version of the invention, the distance between the pupil 13 of the viewer and the front of beamsplitter 211 is on the order of 30 millimeters. The thicknesses of the respective lens in the optical arrangement 15 according to one version of the invention are for example on the order of four millimeters for the width of the beamsplitter 211 itself, about five millimeters in thickness for meniscus lens 117 and 118, and about sixteen millimeters for the radius of the ball lens 17.

The optical arrangement 15 according to the invention further comprises a combiner 16, which is effective for collimating light images for transmission to the eye 13' and pupil 13 of the viewer. The combiner 16 may incidentally be partially transparent, as in fact it has to be in the case of helicopter pilot helmet applications, which require the pilot to be able to see through the combiner 16 to be able to view the outside environment in which flight is conducted.

The combiner 16 is essentially a curved, reflective mirror. According to a preferred embodiment, the shape of the mirror is spherical, and in the version herein, the combiner 16 is tilted downward to be able to receive the transferred image from the object being viewed in region 9. According to the preferred embodiment, the invention employs a seventy (70) millimeter combiner radius. This configuration leads to the pupil image location being close to the middle of the folded ball lens 17.

The optical arrangement 15 further includes folded ball lens 17, which reflect received images transmitted through remaining portions of the optical arrangement 15 upstream therefrom in the direction of the CRT.

The folded ball lens 17, according to a preferred version, comprise a system of lenses in which first and second high index thick meniscus lens, 117 and 118, are preferably cemented to a lower index central element 173 at the center of which the aperture stop is located. The surfaces of the two meniscus lens 117, 118 are made nominally concentric about ball lens 17. Thus, the chief rays entering and leaving the ball lens, are accordingly at a particularly low angle of incidence with respect to an axis perpendicular to the lens surfaces, and thus introduce minimal astigmatism into the arrangement.

The symmetry of the arrangement further implies that odd powered aberrations, i.e., coma and distortion, will be relatively small.

The folded ball lens 17 is constructed as a fold element effective for adding positive power o enable formation of an intermediate image, but which adds little field dependent aberration to that of the combiner 16. The meniscus lens 117, 118 are relatively thin to enable compact packaging of the entire folded ball lens 17, which results in introduction of an undesired, but nonetheless acceptable level of spherical aberration which could otherwise be corrected by employing thicker meniscus lens 117, 118. To achieve the desired field of view on the order of sixty (60) degrees for a given, predetermined typical pupil diameter, while also providing sufficient clearance between the viewer's face and the optical arrangement 15 worn by the viewer, combiner 16 is required to have sufficient optical power, to effect re-imaging of the pupil within folded ball lens 17.

As can be seen, the various paths of light, 10, 11 and 12 indicated in the Figure, are generally in a collimated state upon entering into or departing from the optical arrangement 15, and as well as when they arrive at pupil 13. These paths converge and diverge repeatedly as the image to be transferred passes through the optical arrangement 15. In particular, the image being viewed is converged by folded ball lens 17, until it passes the focal point of the ball lens 17 in the direction of collimator/combiner 16, after which point it begins once again to diverge. After the image reaches collimating combiner 16, the image transferred is again collimated for presentation to the pupil 13 of the viewer.

According to one version of the invention, the optical arrangement 15 is mounted in a helmet, which is worn by the viewer. In particular, the optical arrangement 15 permits viewing a display (not shown), which presents an image to be viewed by the optical arrangement 15 at an overall horizontal field of view of sixty (60) degrees. The display is to have an un-vignetted pupil diameter of ten (10) millimeter.

The ball lens 17 very nearly collimates the rays focused by the combiner 16. To form a second intermediate image, to allow the final relay to the display to be rotationally symmetric, and to correct the image tilt and asymmetric aberrations introduced by the combiner 16, three additional positive elements are introduced: a negative field flattener 220 for aberration correction and imaging; and two further elements 218 and 219, which are tilted and decentered to be effective for both correction of astigmatism, and bowing or smile distortion. Bowing results, when the lens are removed from the pupil and the fields are spread out on the lens, and when the lens are close to being conjugates of the combiner 16.

By way of additional detail, as can be seen from the Figure, in order to fit around the pilots's face, the total path the light must travel is substantially longer than the diameter of the tube housing the lens elements. In order to transmit an image which subtends a wide field of view at the pilot's eye, the optics must be configured such that more than one image is formed prior to reaching the pilot's eye. These images are known as intermediate images.

In the preferred version of the invention, two intermediate images are formed. The first intermediate image of CRT 9' is formed by lens group 228 adjacent to beamsplitter 211. The final, collimated image is formed at infinity by collimator element 16.

At least one fold is needed in the optical path to enable the package to conform to the pilot's face and helmet. In previous systems which had smaller, e.g., forty (40) degree, fields of view, it was possible to use turn prisms with planar outer and hypotenuse faces to achieve the folding. According to the present invention, this approach continues to be used for the first turn prism 223, because the apparent field of view in that part of the optical system is comparatively small.

It should be noted that optical elements with positive focal lengths, e.g., lens 222 and 225, must be used in conjunction with planar faces turn prisms to ensure that the diameter of the transmitted light bundles does not become excessive.

Use of positive lens in this way introduces various aberrations into the transmitted image, including astigmatism. Astigmatism is an aberration whose magnitude varies with the square of the field angle. Use of positive lens adjacent to planar faced turn prisms in moderate field of view systems introduces a level of astigmatism which is not too large to be corrected by other lens in the optical system.

For wide field of view use, however, the magnitude of astigmatism introduced by the positive lens elements is much greater. Elements with negative focal lengths must be used to introduce compensating astigmatism of the opposite sign. Unfortunately, negative lens diverge the light bundles to diameters which exceed the maximum permissible mounting tube size.

To understand the workings of the present invention, consider the rays of light from any field angle within the field of view which intersect the center of the pilot's eye pupil. These rays are called chief rays. The astigmatism introduced by a lens element can be minimized by minimizing the angle of incidence of all of the chief rays on the lens surfaces. In the optical arrangement 15, the chief rays are images in the center of the pilot's pupil from their divergence point located in the area of the second fold element by the collimator element 16. An optical element whose surfaces are concentric about the crossing point of the chief rays in the area of the second fold element will introduce zero astigmatism, because the chief rays are all at normal incidence to the surfaces of the element. Folded ball lens 17 is an element which satisfies these conditions.

The ball lens 17 has additional advantages beyond providing a reduced level of astigmatism. Because the chief rays enter and exit the ball lens 17 in a symmetric fashion, aberrations such as coma and distortion which depend on an odd power of the field angle cancel each other out.

Although the chief rays pass undeviated through the ball lens 17, the rays surrounding the chief rays from a given image point are not incident normal to the ball lens 17 surfaces and are refracted. For these rays, the ball lens 17 is a very thick positive lens element which cooperated with lens group 215 to form the second intermediate image.

The remaining aberration of importance is spherical aberration. A single monolithic ball lens 17 has residual spherical aberration which must be compensated by other optical elements. One version of this invention incorporates first and second meniscus lens 117, 118 elements surrounding the ball lens 17 and defining outer surfaces which are concentric about the center of the ball lens 17. The ball lens 17 itself, according to this version of the invention, is made from a material which has a lower index of refraction than the materials employed for the meniscus element. If the thicknesses of the meniscus lens 117, 118 are chosen in cooperation with the refractive index of the ball lens 17, the spherical aberration introduced by the combination will be minimized. In the preferred version of the invention, the meniscus elements which reduce spherical aberration to zero would be too thick to thick for the available space. Thus, the preferred version of the invention requires additional compensation for spherical aberration with other elements of the arrangement.

As indicated above, the lens group 215, in cooperation with folded ball lens 17, forms the second intermediate image adjacent to beamsplitter 211. This image is then projected by collimator 16, so as to appear to the pilot at infinity. According to a preferred version of the invention, the collimator 16 is a partially reflecting concave mirror with a spherical profile. In other versions of the invention, the collimator 16 could be completely reflective, or could even be a lens element. The focal length of the collimator 16 is such that the chief ray crossing point inside the ball lens 17 is images by the collimator 16 into the pupil of the pilot's eye. The collimator images finally are transmitted by the beamsplitter 211 to the exit pupil 9 of the optical system.

The operation of the beamsplitter 211 in both reflection and transmission is discussed in detail in the abovereferenced and incorporated patent application. In order to achieve a sufficiently high display brightness, the light beams in reflection and transmission are incident at different angles. The collimator 16 accordingly must be tilted with respect to the center of the field of view to generate sufficiently high display brightness. Unfortunately, the tilting of the collimator 16 introduces image aberrations of a non-symmetric nature which reduce the quality of the transmitted images.

To compensate for the asymmetric aberration introduced by the tilted collimator 16, compensative asymmetry must be introduced elsewhere in the overall optical arrangement. An effective way to achieve this is to use elements which are conjugate to the source of the aberration, i.e., elements which are imaged by intervening optics into the region of collimator 16. This technique is employed to select and orient the elements of lens group 215. These lens are tilted and decentered, by well-known optical computer techniques, to compensate effectively for the asymmetric aberrations generated by the tilted collimator 16.

As can be seen from the above, the invention herein is clearly directed toward an optical arrangement for relaying indications of selected images displayed at an arbitrary location and presenting said images in a collimated, large field of view to the pupil of a viewer's eye. In particular, the optical arrangement according to the invention comprises organizing said indications into intermediate images at a selected intermediate location after taking indications of selected images from an arbitrary display location. The ball lens 17 receives these indications through a first surface portion and directs these indications through a second surface portion thereof toward the pupil of the viewer's eye. The ball lens 17 is centered substantially at the selected intermediate location. The invention can include an optical collimator 16 to receive the indications from the ball lens 17, which is effective for projecting the intermediate images toward infinity in the direction of the viewer's eye. The indications pass substantially perpendicularly through the surfaces of said ball lens 17. The ball lens can comprise first and second meniscus lens 117, 118. The ball lens 17 preferably comprise low index of refraction material relative of the refractive index materials employed by said meniscus lens 117, 118. The field of view of said arrangement of the invention is preferably sixty (60) degrees. The collimator 16 can for example be a combiner and can for example include the form of a portion of a sphere. The collimator 16 preferably defines a concave surface, which is at least partially reflective. The optical arrangement of the invention can further comprise a beamsplitter 211 for reflecting beams of light between the ball lens and collimator 16. The beamsplitter 211 can be effective for folding the path of light between the ball lens and collimator 16. The beamsplitter 211 is preferably positioned in the path between the pupil of the viewer and collimator 16. The beamsplitter 211 is partially transparent. The beamsplitter 211 is reflective and transparent depending upon the angle of incidence of light upon its surface. Collimator 16 is tilted from the line of sight between the viewer's pupil and the center of collimator 16. Collimator 16 is sufficiently tilted from the line of sight between the viewer's pupil and the center of collimator 16 to enable the reflection of light from the ball lens to collimator 16. The reflected light from the beamsplitter 211 is re-reflected by collimator 16 and passes through the beamsplitter 211. The tilting introduces considerable aberration in the image transferred by collimator 16.

The optical arrangement clearly comprises relaying indication of selected images displayed at an arbitrary location and presenting these images in a collimated, large field of view to the pupil of a viewer's eye. To do this, the optical arrangement of the invention comprises organizing said indications into intermediate images at a selected intermediate location, taking indications of the selected images from an arbitrary display location. The ball lens is to receive indications from a first surface portion of the ball lens to directing these indications through a second surface portion thereof toward the pupil of the viewer's eye. The ball lens is centered substantially at the selected intermediate location and collimator 16 receives indications from the ball lens to project the intermediate images toward infinity in the direction of the viewer's eye. The indications pass substantially perpendicularly through the surfaces of the ball lens. The optical arrangement further comprises a beamsplitter 211 for reflecting beams of light between the ball lens 17 and collimator 16. The beamsplitter 211 is effective for folding the path of said light beam between the ball lens 17 and collimator 16. The ball lens 17 is folded by a reflecting surface passing through its center. Collimator 16 provides substantially all of its indications to the pupil at an angle of incidence to said pupil from the line of sight to the center of said collimating means of no more than about five (5) degrees.

Clearly, the optical arrangement relays indications of selected images displayed at an arbitrary location and presents these images in a collimated, large field of view to the pupil of a viewer's eye. This optical arrangement comprises organizing the indications into intermediate images at a selected intermediate location and taking indications of the selected images from said arbitrary display location. The ball lens 17 receives the indications through a first surface portion thereof, and the ball lens 17 directs the indications through a second surface portion thereof toward the pupil of the viewer's eye. The ball lens 17 is centered substantially at this intermediate location. Collimator 16 receives the indications from the ball lens 17 and is effective for projecting the intermediate images toward infinity in the direction of the viewer's eye. The beamsplitter 211 reflects beams of light between the ball lens 17 and collimator 16 and is effective for folding the path of the light beam between the ball lens 17 means and collimator 16.

Further, the optical arrangement had a folded optical path and comprises producing an intermediate image at a selected location along the optical path, and folding the optical path at said selected location. Folding comprises using a reflective, flat surface and a spherical lens surface substantially centered about the selected location. The optical arrangement further comprises a hemispherical ball lens 17 defining a flat, reflective surface through its center, whereby light rays folded by said means for folding will be transmitted substantially perpendicularly to the spherical surfaces of said ball lens 17, thereby improving image quality over the field of view of said optical arrangement.

The invention, according to the preferred embodiment shown herein, additionally has significant mechanical advantages. Whereas prior approaches to the problem used one or more positive lens mounted on either side of the planar-faced turn-prism, thus requiring the exceedingly careful and sensitive mounting and aligning of three (3) separate and independent lens elements at the same time, the instant invention permits the convenient mounting of the ball lens 17, in combination with its meniscus lens 117, 118, as a single unitary optical component which does not require independent adjustment and alignment of each of its subelements independently.

Many changes and alterations will occur to those skilled in the art, and we do not wish to be limited to the disclosures used in connection with the preferred embodiment, I intend only to be limited by the following claims.

I claim:

1. An optical arrangement with a folded optical path, said optical arrangement comprising: means for producing an intermediate image at a selected location along said optical path, and means for folding said optical path at said selected location, said means for folding comprising a reflective flat surface and a spherical lens surface substantially centered about said selected location.

2. The optical arrangement according to claim 1, wherein said means for folding comprises a hemispherical ball lens defining a flat, reflective surface through its center, whereby light rays folded by said means for folding will be transmitted substantially perpendicularly to the spherical surfaces of said ball lens means, thereby improving image quality over the field of view of said optical arrangement.

3. The arrangement of claim 2 wherein said optical arrangement further comprises collimating means for receiving said intermediate image from said ball lens means, said collimating means being effective for projecting said image in collimated fashion in the direction of a viewer's eye so that the image appears as if located at infinity.

4. The arrangement of claim 3 wherein said collimating means includes a partly reflecting portion of a sphere.

5. The arrangement of claim 3 wherein said arrangement further comprises beamsplitter means for reflecting beams of light between said ball lens means and said collimating means.

6. The arrangement of claim 5 wherein said beamsplitter means is positioned in the path between the viewer's eye and said collimating means.

7. The arrangement of claim 3 wherein said collimating means is tilted from the line of sight between the viewer's eye and the center of said collimating means.

8. The arrangement of claim 7 wherein said tilting introduces considerable aberration in the image transferred by said collimating means and wherein said optical arrangement further comprises means for correcting aberration.

9. The arrangement of claim 2 wherein said ball lens means includes meniscus lens means on the spherical surfaces.

10. The arrangement of claim 9 wherein the index of refraction of said ball lens means is low relative to the index of refraction of the meniscus lens means.

* * * * *